Aug. 7, 1956      E. R. KUGHLER      2,757,812
LIFT TRUCK ATTACHMENT FOR DRUMS AND THE LIKE
Filed June 11, 1951      6 Sheets-Sheet 1

INVENTOR
EDWIN R. KUGHLER
BY
ATTORNEYS

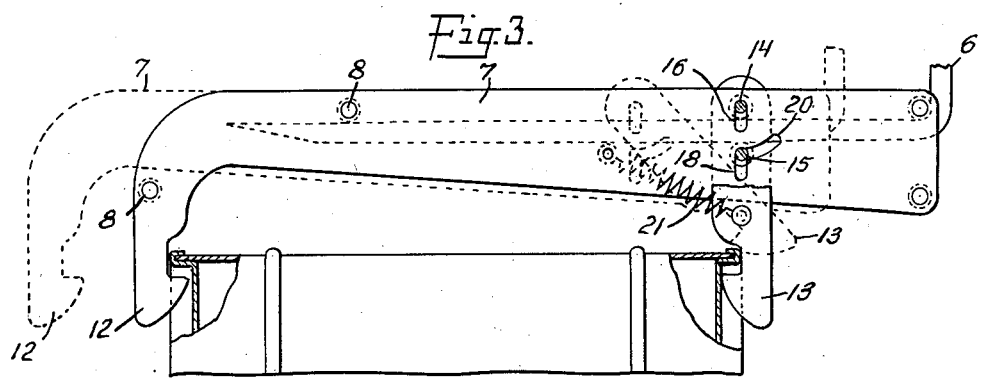
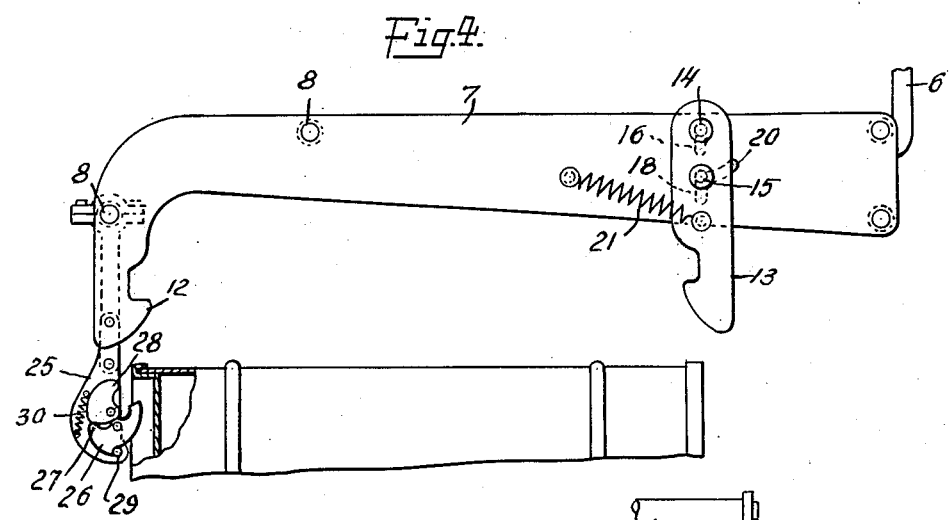
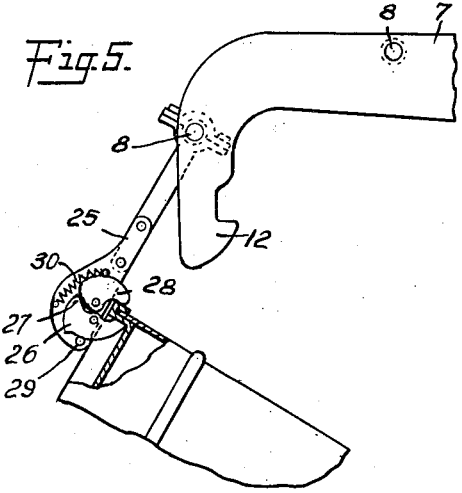
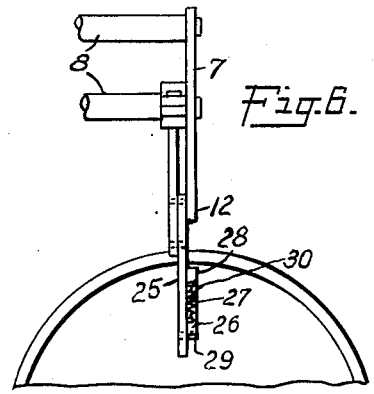

Aug. 7, 1956    E. R. KUGHLER    2,757,812
LIFT TRUCK ATTACHMENT FOR DRUMS AND THE LIKE
Filed June 11, 1951    6 Sheets-Sheet 3
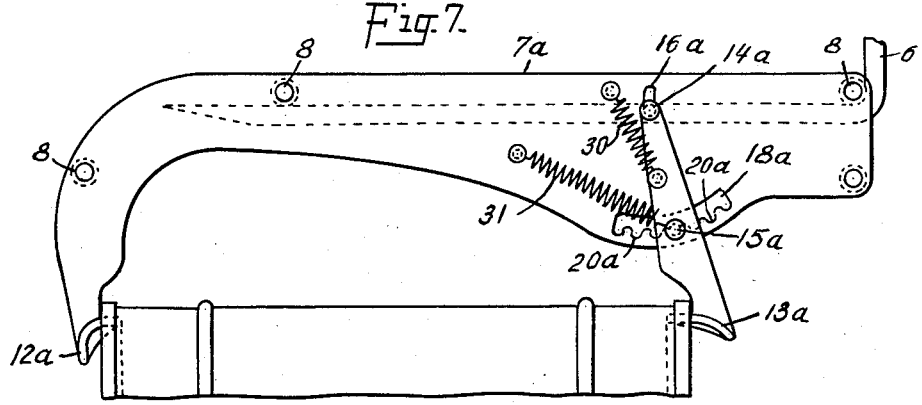
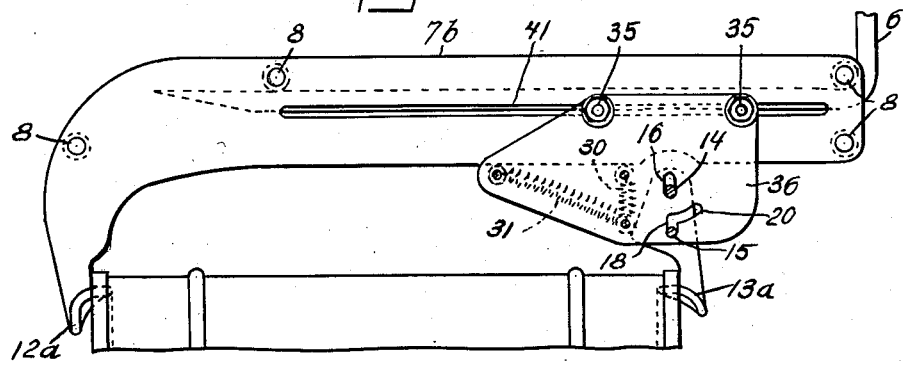
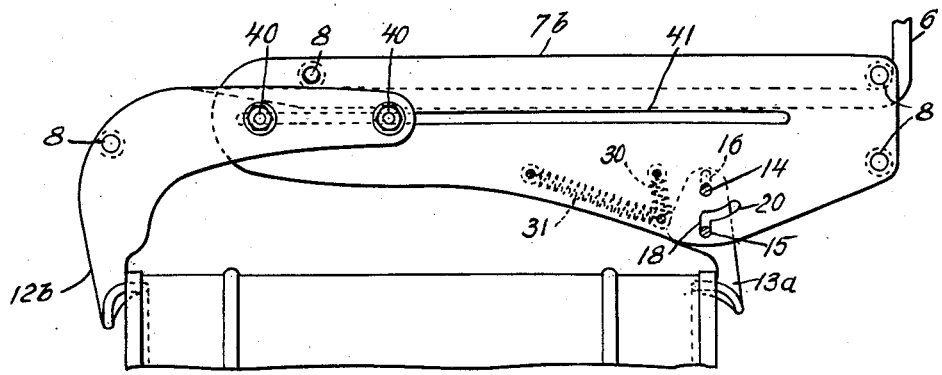
INVENTOR
EDWIN R. KUGHLER
BY
ATTORNEYS Aug. 7, 1956 E. R. KUGHLER 2,757,812
LIFT TRUCK ATTACHMENT FOR DRUMS AND THE LIKE
Filed June 11, 1951 6 Sheets-Sheet 4

INVENTOR
EDWIN R. KUGHLER
BY
ATTORNEYS

Aug. 7, 1956 E. R. KUGHLER 2,757,812
LIFT TRUCK ATTACHMENT FOR DRUMS AND THE LIKE
Filed June 11, 1951 6 Sheets-Sheet 5
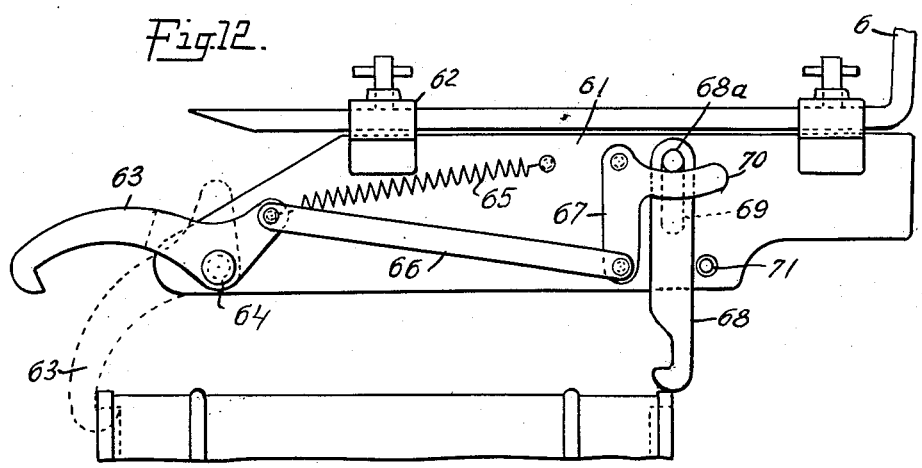
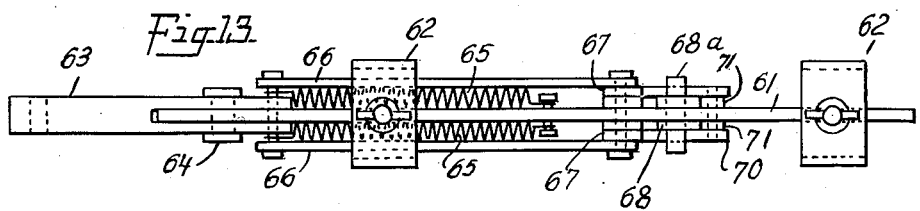
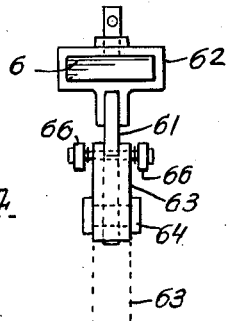
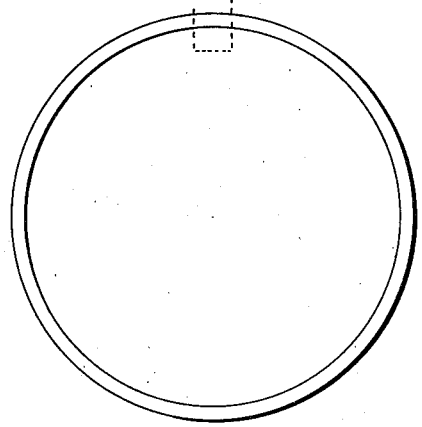
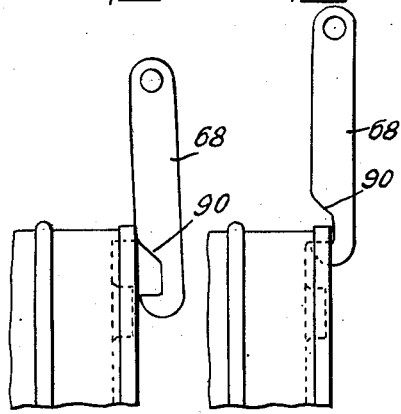
INVENTOR
EDWIN R. KUGHLER
BY
ATTORNEYS Aug. 7, 1956 E. R. KUGHLER 2,757,812
LIFT TRUCK ATTACHMENT FOR DRUMS AND THE LIKE
Filed June 11, 1951 6 Sheets-Sheet 6
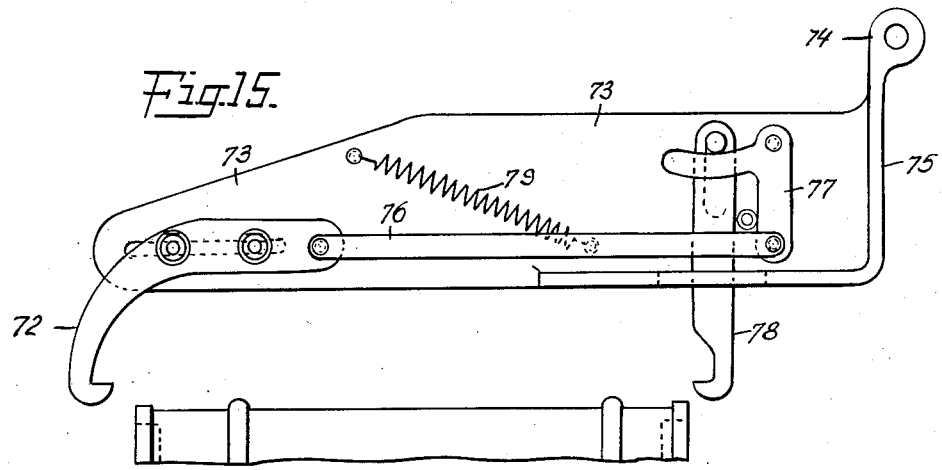
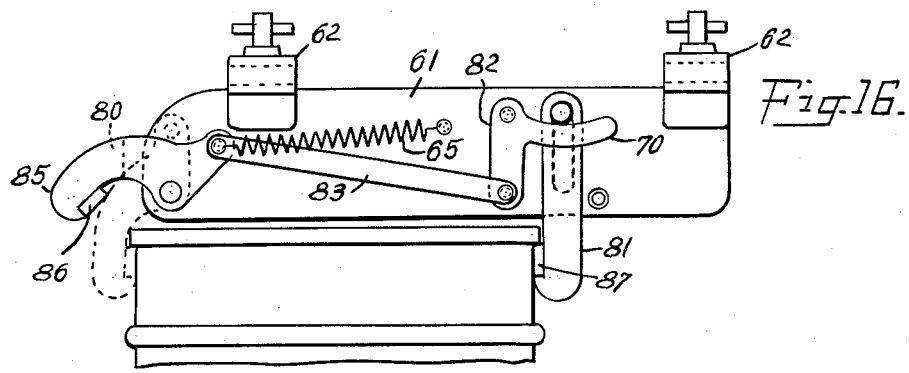
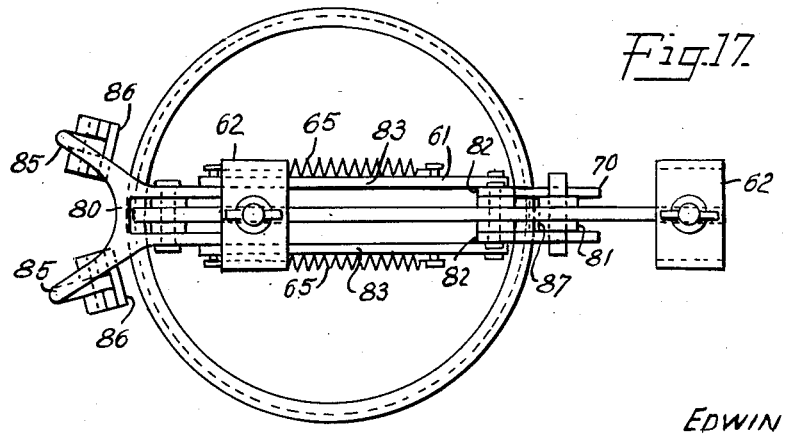
INVENTOR
EDWIN R. KUGHLER
ATTORNEYS

United States Patent Office 2,757,812
Patented Aug. 7, 1956

2,757,812

LIFT TRUCK ATTACHMENT FOR DRUMS AND THE LIKE

Edwin Russell Kughler, Rye, N. Y.

Application June 11, 1951, Serial No. 230,858

9 Claims. (Cl. 214—653)

This invention relates to barrel-handling apparatus and has for its object to provide an attachment for an ordinary lift truck by means of which the operator of the lift truck without leaving his seat may pick up one or more barrels, transport them to a new location, and deposit them where desired.

One of the objects of the invention is to provide an apparatus of the class described which is entirely automatic in gripping and releasing the barrels so that the driver of the lift truck performs no operations other than raising and lowering the lifting apparatus and driving the truck forward and backward as ordinarily required in picking up and transporting a loaded pallet or skid.

A further object of the invention is to provide a device of the character described wherein the weight of the barrel serves to positively lock the barrel-engaging parts in barrel-holding position so that the barrel cannot be dislodged from the gripping device without taking the weight of the barrel completely off the gripping device and then dislodging the gripping device from the rim of the barrel.

A further object of the invention is to provide an apparatus of the class described wherein the lift truck may approach the barrels to be handled either from the side or the end and deposit them in the same position with respect to the path of travel or at an angle thereto, whereby barrels may be taken from a location where they are accessible only from the ends and deposited in a car or other location where it is necessary that the axis of the barrel be parallel with the line of movement of the truck.

A further object of the invention is to provide an apparatus of the class described which is self-adjusting to handle barrels of different lengths.

A further object of the invention is to provide a device of the class described by means of which barrels taken for storage on their sides may by transported to their new location and there set on end, all without any manipulation of the barrel other than can be accomplished by the driver of the lift truck.

A further object of the invention is to provide a barrel hoisting device controlled entirely by the movement of the lift truck which will firmly grip barrels sitting on end, lift them to the desired elevation, carry them to a new location and deposit them in upright position wherever desired.

A further object of the invention is to provide a lift truck attachment for handling barrels which may be readily attached to the usual lift forks and detached therefrom quickly and without tools, whereby a single lift truck may be used for handling mixed cargoes of barrels, bales, boxes and the like without significant time loss in shifting from one type of goods to another.

A further object of the invention is to provide a like attachment which may be substituted for the forks of the lift truck also quickly and without special tools.

A further object of the invention is to provide a barrel gripping and hoisting device by means of which the operator of a lift truck, while moving forward, can, without stopping or backing his truck, grip a barrel, lift it from the ground and carry it away.

Other objects of the invention will appear from the following specification and the accompanying drawings, wherein I have described and illustrated a preferred form of my improved barrel-handling apparatus and also several modifications, as will be later described.

In the said drawings:

Fig. 3 is a detail view showing in dotted and full line, respectively, two positions of the barrel-holding parts in the operation of gripping the barrel;

Fig. 4 is an elevational view similar to Fig. 3 but showig the barrel-lifting device equipped with my improved mechanism for turning the barrel from horizontal to vertical position;

Figs. 5 and 6 are detail views of the barrel up-ending device shown in Fig. 4;

Fig. 7 is a side elevation similar to Fig. 3 but showing a modified form of the device which is self-adjusting to handle barrels of different length;

Fig. 8 is a side elevation of a barrel-handling mechanism which may be manually adjustable to handle barrels of different lengths;

Fig. 9 is a side elevation of a modified form of the manually adjustable type of barrel-handling mechanism;

Fig. 12 is a side view of a modified form of the invention wherein the gripping of the barrel is accomplished by the continued forward and lifting movement of the truck;

Fig. 13 is a plan view of the device shown in Fig. 12 detached from the lift truck;

Fig. 14 is an elevational view looking from the left of Fig. 12;

Fig. 15 is a side view of a modified form of the device shown in Fig. 12 adapted for substitution for each fork of a conventional lift truck for lifting and moving a single barrel;

Fig. 16 is a side elevation of a form of the invention adapted for lifting barrels sitting on their ends;

Fig. 17 is a plan view of the device shown in Fig. 16; and

Figs. 18 and 19 are detail views of a modified shape of barrel-gripping hook.

Figure 1:
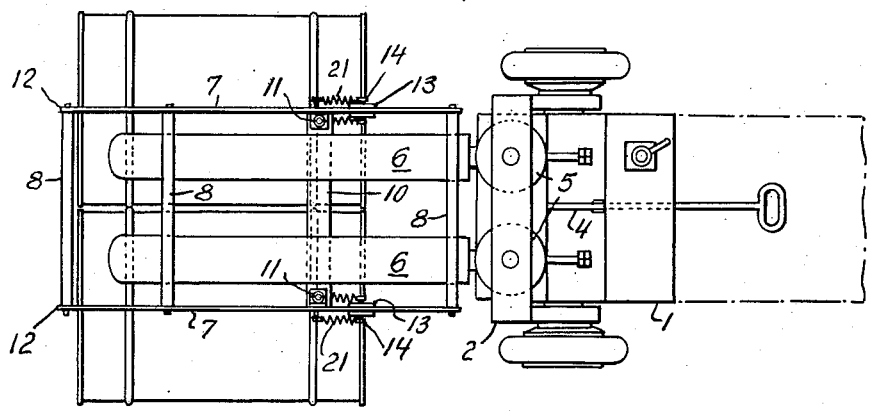
Fig. 1 is a plan view of a portion of a conventional lift truck equipped with the barrel-handling apparatus embodying my invention for handling two barrels at a time.
Figure 2:
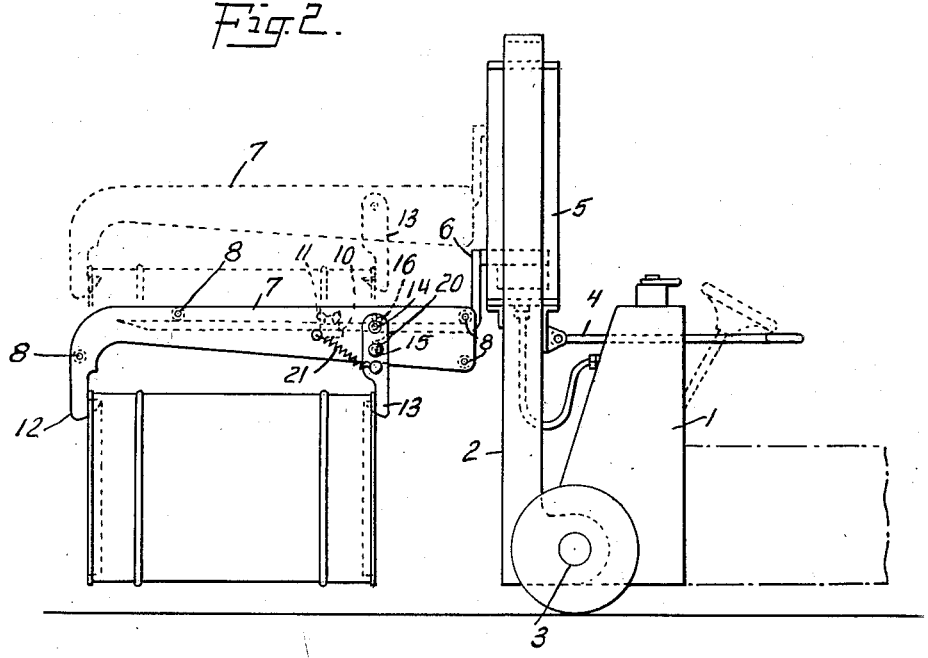
Fig. 2 is a side view of the apparatus shown in Fig. 1.

Referring to the drawings, particularly to Figs. 1, 2 and 3, 1 indicates a conventional lift truck which is diagrammatically illustrated and, as shown, comprises the usual upright frame 2 supported on the front axle 3 of the truck and provided with means, here shown as a lever 4, for tilting the frame slightly either forward or backward from its normal vertical position.

The lifting mechanism comprises one or more hydraulic cylinders 5 equipped with pistons and cross heads, not shown, to which is attached the lift fork 6. The mechanism so far described constitutes merely one form of the conventional lift truck for handling skids and pallets. My improved barrel-handling mechanism is designed to be attached directly to a conventional lift fork.

The mechanism shown in Figs. 1, 2 and 3 is designed to lift two barrels at a time although it may be constructed to lift three or more barrels by mere duplication of the parts herein shown. Also, of course, one set of barrel-engaging parts may be omitted and the truck used for handling one barrel at a time. The apparatus comprises side frame members 7 of the shape and size shown which are preferably cut from sheet steel of boiler plate thickness. The two side frame parts 7 are rigidly fastened together by cross bars 8, here shown as four in number, which are of a length to space the arms a distance apart equal to the diameter of the barrels to be handled so that when one arm 7 is vertically over the axis of one barrel of a row of contacting barrels resting on their sides, the other arm 7 will occupy the same position with respect to the second barrel in the row. The side arms 7 and cross bars 8 may be rigidly attached together by welding or upsetting the reduced ends of the rods against the outer faces of the side arms.

Two of the cross members 8 are so positioned as to rest on the upper surface of the forks 6 of the lift truck with the rear cross bar in the corner between the vertical and horizontal portions of the fork. The frame is preferably clamped to the lift truck in this position. Any suitable clamping means may be employed. I have shown for the purpose a clamping bar 10 extending across between the two side arms 7, beneath the horizontal portions of the lift forks 6, the bar being clamped against the lift forks by means of screws 11 mounted in lugs riveted or welded to the inner faces of the side arms 7. The front end of each side arm 7 is shaped to provide a hook 12 having a horizontal shoulder of a length substantially equal to the flange of the conventional oil barrel. The vertical edge of the hook portion beneath the shoulder is beveled as shown so that when the hook is lowered against the edge of the barrel the inclined surface will tend to push the barrel backward.

Attached to each of the side members 7 at a distance from the hooks 12 approximately equal to the height of the barrel to be handled is a second hook 13 for engaging the flange at the opposite end of the barrel. This second hook is preferably a double hook made of two identical sheet metal pieces spaced apart a distance to receive the member 7 between them. The second hooks 13 swing and also move bodily with respect to the side members 7 and to this end the two portions of each double hook are connected by two pins 14 and 15 which extend through slots 16 and 18, respectively, in the side members 7. The upper slot 16 is a vertical slot, whereas the slot 18 has a vertical portion corresponding in length and position with slot 16 and with an arcuate portion 20 extending upwardly and rearwardly from the upper end of the straight portion. The center of curvature of the arcuate portion 20 coincides with the center of the pin 14 when in its uppermost position at the upper end of the slot 16 whereby when the double hook 13 is in its elevated position in which it is normally held by a suitable spring 21 when there is no load on the hook, the hook is free to swing about the pin 14 as an axis. The spring 21 is positioned to normally bias the hook 13 both upward and toward the hook 12.

In operation the frame consisting of the side members 7 and cross bars 8 is clamped to the forks of the lift truck and the fork lifted high enough for the hooks to clear the barrels to be lifted. The operator of the truck drives the truck toward the end of the barrels with the frame in such position that each of the side members 7 approximately overlies the center of one of the pair of adjacent barrels to be lifted. When the front hook 12 projects slightly beyond the forward end of the barrels, for example, when in the position shown in dotted lines in Fig. 3, the lifting mechanism is lowered so that the forward hooks 12 move downwardly in front of the ends of the barrels. As the frame is lowered the rear hooks 13 will engage the upper walls of the barrels and be turned backwardly against the tension of the springs 21 to the position shown in full lines in Fig. 3. It will be understood that the bottom inclined surface of each hook 13 is so shaped that the point of engagement of the hook with the barrel is rearwardly out of line with the center of the pin 14 so that the hook will turn backwardly against the tension of the spring as the frame is lowered. When the frame is lowered sufficiently for the flat horizontal faces of the hooks 12 to be below the inner face of the rims of the barrels the operator backs the lift truck, and immediately thereafter starts the lifting mechanism. As the truck moves rearwardly the hooks 13 will snap under the rear rim of the barrel and as the backward movement continues the hooks will swing forward until the hooks are in vertical position and the pins 15 are at the upper ends of the vertical portions of the slots 18. When the hooks reach this position with relation to the barrels the front hooks 12 will entirely underlie the front rim of the barrels and any further rearward movement of the truck will tend to move the barrel. At this point the lifting mechanism will begin to lift the frame and hooks so that the weight of the barrel comes on the hooks, thereby pulling the hooks 13 downwardly as far as permitted by the length of the slots 16 and 18.

This movement pulls the pins 15 down to the bottom of the vertical portions of the slots 18, thereby locking the hooks 13 in vertical position and against pivotal movement. The barrels are thus raised off the floor and are free to be carried to any desired location. With the weight of the barrel on the hooks the hooks cannot be separated to release the barrel.

When it is desired to release the barrels it is only necessary that the forks be lowered until the weight of the barrel is off the hooks and the hooks 13 are free to move vertically under the action of the springs 21 a distance equal to the length of the vertical portion of the slots 18. In this position the hooks 13 are again free to swing about the pins 14 which are in the upper ends of the vertical slots 16. After lowering the barrel to take the weight off the hooks and allow the hooks 13 to shift sufficiently to be free to swing about their pivots, the operator moves the truck forwardly a sufficient distance for the hooks 12 to clear the rims of the barrels when moved upwardly. The vertical frame 2 of the lift truck is then tilted backward by means of the lever 4 a sufficient distance to elevate the front hooks above the rims of the barrels. The lift truck is then backed away from the barrels, which it is now free to do.

By the mechanism above described barrels may be handled two at a time rapidly and with no more manipulation of the lift truck than required to handle the customary pallets and skids. The slight rearward movement of the truck necessary to secure the proper grip of the hooks on the barrel before the barrel is lifted is of no significance. A lift truck operator experienced in handling loads on pallets and skids requires no additional training to handle barrels with equal facility.

In the actual use of the apparatus the backward movement of the truck and the lifting movement are easily timed so as to be done as one continuous operation. Also, in unloading the barrels the tilting movement of the vertical frame to release the forward hook is but a slight movement which adds nothing to the time required for lowering the truck to take the weight off the forks as now required in the handling of pallets and skids. In fact, this tilting movement may be omitted and the lift truck moved forward a sufficient distance for the forward hooks 12 to clear the rims of the barrels. During this movement of the lift truck the rear hooks 13 will be turned backwardly on their pivots to an extent such that the pins 15 are in the arcuate portions 20 of the slots 18 and the normally horizontal upper surfaces of the hoosk are inclined downwardly. The lift forks are now elevated, lifting the forks 12 clear of the barrels. During this movement the hooks 13 will turn further about their pivots until clear of the barrel rims.

In Figs. 4, 5, and 6 I have illustrated an attachment for the barrel-handling apparatus by means of which the barrels may by manipulation of the lift truck be turned from horizontal to vertical position. The attachment does not interfere in any way with the operation of the lifting mechanism and need not be removed from the apparatus even though in the particular operation being carried on it is not used. The attachment for a two-barrel hoist comprises two hooks indicated generally by reference numeral 25, which are mounted to swing freely on the lower forward cross bar 8, which, as shown, is positioned above and slightly forward of the hooks 12. The two hooks 25 are mounted on the cross bar immediately adjacent the hooks 12 and in normal operation, that is, when there is no load on the apparatus, extend downwardly below the hooks 12 by a sufficient distance for the hooks 12 to be completely clear of the barrels on the upward movement of the lifting device before the hooks 25 engage the rims of the barrels. Each hook 25 is provided with a pivoted lug or finger 26 whose free end projects rearwardly and upwardly in a position to engage under the flange of the barrel if the upward movement of the mechanism be continued after the hooks 12 are fully clear of the barrels. The lug or finger 26 is pivoted to swing downwardly under the weight of the barrel. Each lug 26 projects forwardly from its pivot pin and is formed with a projection or nose 27 whose upper edge presses against a locking member 28 also pivoted on the face of the hook 25, the arrangement being such that when the lug 26 is turned about its pivot by pressure on its free end the locking member 28 will be turned on its pivot due to pressure of the nose 27 against the locking member to thereby move the free end of the locking member toward the free end of the lug 26. As shown more particularly in Fig. 4, a spring 30 attached to the locking member holds the gripping members normally open to the extent permitted by stop pins 29. As the lift forks continue their upward movement the engagement of the barrel rims with the lugs 26 causes the lugs to turn about their pivots, pressing the projections 27 against the locking members 28 and thereby turning the locking members on their pivots until the rims of the barrels are gripped between the lugs 26 and members 28. The greater the weight of the barrel and the consequent pull on the free ends of the lugs 26, the stronger the pressure of the locking members against the outer edges of the barrel rims. The barrel rims are thus tightly gripped by the lugs 26 and the locking members 28 and the continued upward movement of the lift will cause the front ends of the barrels to be raised. As the lifting movement is continued the truck is backed at the proper relative speed for the hooks 25 to substantially follow the arc of movement of the rims of the barrels in being tilted from horizontal to vertical position. By means of the locking members 28 the barrels are so firmly held that they cannot be accidentally dislodged so long as any substantial portion of their weight is carried by the lugs 26. When the barrels are tilted to such an extent that the greater portion of the weight is forward of the points of contact with the ground, the barrels will tend to move more rapidly than the hooks and consequently the load will be taken off the lugs 26 and the springs 30 will release the locking members and allow the barrels to settle down on their ends.

In using the tilting attachment above described in conjunction with the lifting mechanism, the lift truck operator has merely to back his truck slightly away from the barrels after the hook 12 is clear of the rim of the barrel but while the hook 25 is below the level of the rim. He then elevates the lifting forks and at the same time shifts his truck away from the barrels which will be released and swing clear of the hooks as soon as the centers of gravity of the barrels are beyond the points of contact of the barrels with the ground.

In Fig. 7 I have shown a modified form of my improved barrel handling mechanism wherein, without manual adjustment, the apparatus will handle barrels of different lengths. As here shown the side members 7a of the frame are formed with upper vertical slots 16a similar to the slot 16. Beneath the slot 16a each arm 7a has an arcuate slot 18a of sufficient length to permit the hook 13a to swing through an arc of considerable magnitude. The hook 13a is provided with two pins 14a and 15a. The pin 14a extends through the slot 16a and serves as a movable pivot for the hook while the pin 15a projects through the slot 18a. This slot is, as stated, an arcuate slot and its upper edge is of circular contour. The lower edge, however, is provided with a series of radial notches 20a each one of which in operation corresponds with the vertical portion 20 of the slot 18 above described. Two springs 30 and 31 are preferably provided instead of one, so that the hook 13a will, when no load is being lifted, be held firmly in its uppermost position and with its lower end biased toward the hook 12a at the end of the arm 7a. In using this form of mechanism the vertical arms 2 supporting the lifting mechanism are tilted somewhat rearwardly so that the hooks 12a will clear the top of the barrels but the hooks 13a will engage under the rims of the barrels during the movement of the frame over the barrels. When the lift truck is moved a sufficient distance for the front hooks 12a to clear the front rims of the barrels the frame 2 is swung forwardly to lower the front hooks 12a until their barrel engaging portions are at a lower level than the barrel rims. The lift truck is then backed up slightly to bring the hooks 12a under the rims of the barrels. During this movement the springs 31 will hold the hooks 13a against the rim of the barrel so that the pin 15a will move forwardly relative to the notched edge of the slot 20a until both hooks are fully disposed beneath the opposite barrel rims. If, now, the lift mechanism be elevated the weight of the barrel will hold the hook 13a against upward movement so that the pin 15a will be drawn into whatever notch of the slot 18a is beneath the pin and thus hold the hook 13a against swinging movement until the barrel is moved to the desired location and is ready to be released. To release the barrels the lift truck is manipulated in precisely the same manner as above described. The lift mechanism is lowered sufficiently for the hooks 13a to clear the rims of the barrels and for the pins 15a to be drawn upward by the springs 30 against the upper edges of the slots 18a. In this position the hook 13a is free to swing on its pivot. The truck is moved forward slightly and the frame 2 tilted in order for the hooks 12a to clear the barrel rims. The lifting truck can now be backed away from the barrels.

In Fig. 8 I have illustrated a modified form of apparatus wherein the front and rear barrel hooks may be relatively adjusted to accommodate barrels of different heights. As here shown the side members 7 are provided with longitudinal slots parallel with the horizontal portions of the lift bars to receive clamping bolts 35 on which are supported plates 36. Each plate 36 is provided with hooks 13a and with slots and pins similar to those above described. This apparatus operates precisely as the apparatus illustrated in Figs. 1, 2 and 3, the position of the plates 36 with respect to the hooks 12 being first adjusted to correspond with the height of the barrel being operated on. In Fig. 9 I have shown a further modified form of apparatus for handling barrels of different lengths, and in the form here shown the front hooks 12b are separate from the side member 7b and adjustably connected thereto by means of clamping bolts 40 working in slots in the side members 7b.

Figure 10:
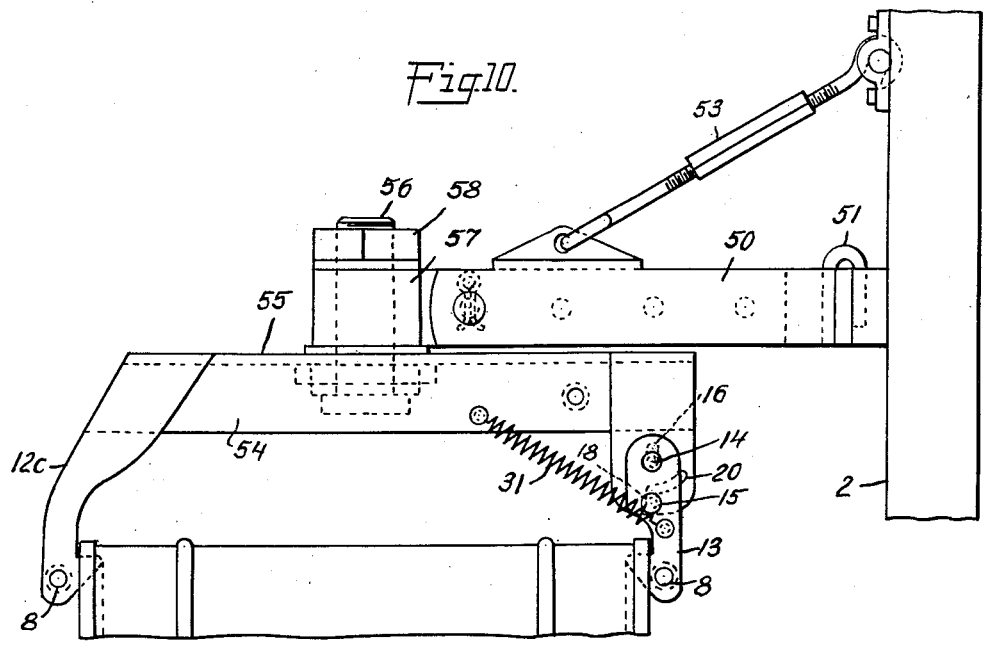
Fig. 10 is a side elevation of a modified form of the apparatus by means of which the barrels to be handled may be approached with the lift truck either toward the sides or the ends of the barrels, as may be necessary.
Figure 11:
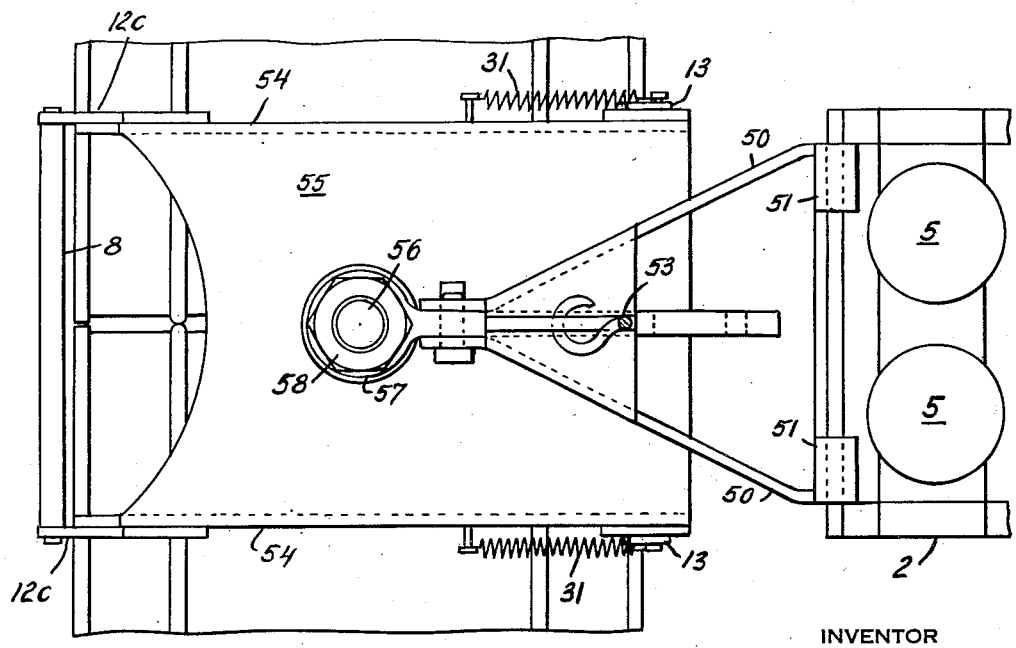
Fig. 11 is a plan view of the apparatus shown in Fig. 10.

In Figs. 10 and 11 I have shown a special mounting for my barrel gripping device whereby the apparatus may be used to pick up barrels which are so positioned that the lift truck may approach toward the side of the barrel instead of toward the end. The mechanism here shown consists of a triangular bracket 50 having at its base a pair of hooks 51 adapted to hook over one of the cross bars customarily employed between the vertical members of the frame 2. The bracket 50 is maintained in horizontal position by means of a tie rod 53 which extends rearwardly and upwardly from the apex of the triangular frame. The barrel-gripping mechanism is suspended from a frame comprising side members 54 welded or otherwise secured along their upper edges to an oblong plate 55 which provides a turntable support for the barrel-gripping hooks. This turntable support is suspended from the bracket 50 by means of a vertical trunnion 56 projecting upwardly from the upper side of the plate 55 through an eye 57 projecting forwardly from the apex of the triangular frame 50. The clamp nut 58 is threaded on the upper end of the trunnion 56.

By this arrangement the turntable which I have shown for convenience as positioned to handle barrels lying parallel with the path of movement of the lift truck, may be turned at right angles to the path of movement of the truck and clamped in such position by tightening the clamping nut so that the plane of movement of the hooks 16 about their supporting pins is in a plane perpendicular to the direction of forward movement of the lifting truck. With the turntable so adjusted the truck is preferably turned slightly to bring the hook 12 under the rim of the barrel instead of moving the truck back and forth with respect to the end barrel in the manner above described.

In Figs. 12, 13 and 14 I have shown a modified form of my invention wherein the front hook is movable and so connected with the back hook as to be movable into barrel-engaging position after the back hook engages the barrel, thereby avoiding the necessity of backing the lift truck in order to bring the front hook under the rim of the barrel. As here shown, the barrel-gripping members are supported on a bar 61 to the upper edge of which two fork-engaging clamps 62 are attached, whereby an entirely separate barrel-lifting part may be attached to each of the two forks of the lift truck.

The front hook 63 is bifurcated at its upper end as shown more particularly in Fig. 13, to embrace the end of the bar 61, the parts being pivoted together so that the hook may swing freely about the pivot 64. The hook is normally held in elevated position by springs 65 on each side of the bar 61 and is moved downward into barrel-engaging position shown in dotted lines in Fig. 12 by links 66 connecting the free ends of the bifurcated portions of the hook 63 with the lower ends of bellcrank levers 67 pivoted on each side of the bar 61 adjacent to the rear hook 68.

The rear hook 68 is also bifurcated to embrace the bar 61 and is connected to the bar by a pin 68a which projects through the upper end of the hook 67 and works in the vertical slot 69 in the bar 61. The ends of the pin 68a overlie the rearly projecting arms 70 of the bellcranks 67 so that when the hook 68 is pulled downwardly by the weight of the barrel the bellcranks 67 will be turned to move the front hook downwardly to its dotted line position. The rear hook 68 is held against rearward movement by a roller on a pin 71 projecting through the bar 61 near its lower edge.

In operation the parts are in the position shown in Fig. 12 and the lift truck operator, with the forks of the lift truck at an elevation such that with the front hook will clear the barrel to be lifted, drives his truck in position for the hoist to overlie the barrel and for the rear hook to engage under the rear flange of the barrel. He then elevates the forks of the truck so that the rear hook is pulled downward by the weight of the barrel, thereby swinging the front hook downwardly in the dotted line position to engage the front rim of the barrel. The continued upward movement of the forks will then raise the barrel so that it may be transported to the new location.

In Fig. 15 I have shown a modified form of the above described device wherein the front hook 72, instead of being mounted for swinging movement, is mounted for sliding movement on the front end of the bar 73. As here shown, the bar 73 is designed to be substituted for the fork of the lift truck when it is desired to use the lift truck for shifting barrels. In the conventional lift truck the forks are held in position by a cross rod extending through an eye in the upper end of the vertical part of the fork, the vertical portion of the fork resting against the crosshead of the truck in the arrangement shown in Fig. 15. The rear end of the bar 73 is of a shape corresponding with the rear end of the conventional lift truck fork. It is provided with an eye 74 for receiving a cross bolt and a vertical transverse part 75 to rest against the cross head of the truck.

The barrel-gripping device consists of the bifurcated front hook 72 fitting over the end of the bar 73 and connected by links 76 with bellcranks 77 mounted to be turned on their pivot by a bifurcated rear hook 78. The front hook is maintained normally in its forwardly extended position by springs 79 on each side of the bar 73. In using this device the operator brings his truck in position with the bar overlying the barrel to be lifted, lowers the crosshead until the hooks are below the flange of the barrel, then brings the rear hook into engagement with the flange and elevates the crosshead with the barrel. The upward movement of the bar 73, after the rear hook engages the flange of the barrel, moves the front hook inward into engagement with the front rim of the barrel, thereby lifting the barrel.

In Figs. 16 and 17 I have shown a modified form of the gripping and hoisting arrangement shown in Fig. 12 whereby barrels sitting on their ends may be lifted and transported. As here shown, the front hook 80 is mounted for swinging movement in the same manner as the hook 63 and the rear hook 81 is mounted for vertical movement in the same manner as the hook 68 above-described, the parts being connected by suitable bellcranks 82 and links 83 so that the downward movement of the hook 81 with respect to the bar 61 will swing the front hook 89 downwardly in position to grip the barrel in the manner previously described in connection with Figs. 12 to 14. In order to grip a barrel sitting on its end the hook 80 is formed of two members which are spread apart at their lower ends as shown at 85 and are faced with concave gripping shoes 86 shaped to fit the side wall of the barrel immediately beneath the bead at the outer edge of the barrel flange as shown in Fig. 16. In like manner the rear hook 81 is provided with a gripping shoe 87 shaped to fit the wall of the barrel, the concave gripping shoes serving to hold the barrel between them and prevent its lateral displacement. The upper edges of the gripping shoes underlie the bead at the top of the barrel so that when the forks of the lift truck are raised the barrel will be lifted from the ground and firmly held so that it may be transported by the lift truck.

Some types of metal barrels are provided with filling openings in the head adjacent the flange, said filling openings usually consisting of a projecting neck having a screw cap. With barrels having filling openings of this kind it is possible that the barrel may be positioned on the ground with the filling opening at the top where the hook of the lift truck might strike the neck of the filling opening and damage the neck and also interfere with the proper gripping of the barrel. In order to prevent this occurrence the rear hook may be provided immediately above its lifting face with a cam-shaped portion 90 as shown in Figs. 18 and 19 which will engage the outer edge of the barrel rim when the hook portion is opposite the filling opening, thereby preventing the hook engaging the neck of the filling opening. As the hook is moved upwardly and forwardly by the movement of the lift truck, the rim of the barrel will enter the space between the cam portion and the hook, as shown in Fig. 19. When the barrel is again deposited on the ground or other support by the downward movement of the lift forks the cam face 70 will contact the outer edge of the barrel rim and move the barrel forward and thus prevent the end of the hook striking the neck of the filling opening.

In the foregoing specification I have described a number of modifications of my improved barrel hoisting apparatus, but it will be understood that the invention is not limited to the particular modification disclosed but that the structure may be otherwise modified without departing from the spirit of the invention or the scope of the appended claims.

I claim:

1. A barrel carrier comprising a frame member, a hook shaped to engage the rim of the barrel carried by said frame member, a second hook mounted on said frame member is position to engage the rim of the barrel at its opposite end, one of said hooks being mounted for movement toward and away from the other hook, one of said hooks being mounted for limited vertical movement relative to said frame member, and means controlled by the weight of the barrel on said vertically movable hook for maintaining said hooks against movement away from each other when supporting the weight of said barrel, said means comprising inter-engaging parts on one of said hooks and said frame member, respectively.

2. A barrel carrier comprising a frame member, a hook shaped to engage the rim of the barrel carried by said frame, a second hook mounted on said frame member in position to engage the rim of the barrel at its opposite end, one of said hooks being mounted for movement toward and away from the other hook, one of said hooks being mounted for limited movement under the weight of the barrel relatively to said frame member, and means for maintaining said hooks against movement away from each other when said last mentioned hook is in the position to which it is moved by the weight of the barrel.

3. A barrel carrier comprising a frame member, means for attaching said frame member to the forks of a lift truck, a hook shaped to engage the rim of the barrel carried by said frame member, a second hook mounted on said frame member in position to engage the rim of the barrel at its opposite end, one of said hooks being mounted for movement toward and away from the other hook, and means controlled by the weight of the barrel for maintaining said hooks against movement away from each other when supporting the weight of said barrel, said means comprising inter-engaging parts on one of said hooks and said frame member, respectively.

4. A barrel carrier comprising a frame having means for attachment to the forks of a lift truck, said frame having members spaced apart a distance equal to the diameter of the conventional oil barrel, barrel-supporting means carried by said members for simultaneously engaging two barrels, each barrel-supporting means comprising hooks spaced apart a distance corresponding to the length of the barrel, one of said hooks being mounted for movement toward and from the other hook and for a limited vertical movement under the weight of the barrel, and means for holding the hook against movement away from the other hook when moved downwardly by the weight of the barrel, said means comprising interengaging parts carried by said movable hook and said frame member, respectively.

5. A barrel carrier comprising a frame having means for attachment to the forks of a lift truck, said frame having members spaced apart a distance equal to the diameter of the conventional oil barrel, barrel-supporting hooks carried by said members for simultaneously engaging two barrels, the hooks for each barrel being spaced apart a distance corresponding to the length of the barrel, one of said hooks being mounted for movement toward and from the other hook and for a limited vertical movement under the weight of the barrel, and means comprising interengaging parts carried by said hook and said frame member, respectively for holding said movable hook against movement away from the other hook when moved downwardly by the weight of the barrel, and spring means for holding said hook normally in its uppermost position and toward the other hook.

6. A barrel carrier according to claim 1 wherein the frame member consists of parts relatively adjustable to vary the distance between the barrel-engaging hooks.

7. A barrel carrier according to claim 4 wherein the attachment between the lift truck and the frame comprises a turntable permitting the frame to be turned in a horizontal plane relative to the forks of the lift truck.

8. A barrel-handling apparatus comprising a frame for attachment to a lift truck, a pair of barrel-supporting hooks carried by said frame, a swinging member carried by said frame, a third hook at its lower free end, a barrel-engaging lug at the end of said third hook, a locking member co-operating with said lug and connections between the lug and the locking member whereby pressure on the end of the lug causes the locking member to move toward the end of the lug to thereby engage the rim of a barrel between the lug and the locking member when the lug engages the barrel rim and the frame is elevated to lift the end of the barrel.

9. A barrel-handling apparatus comprising a frame for attachment to a lift truck, a hook mounted on said frame for vertical movement, a second hook mounted on said frame for movement toward and away from the first mentioned hook, and connections between said hooks for causing said second mentioned hook to be shifted toward said first mentioned hook upon downward movement thereof.

References Cited in the file of this patent

UNITED STATES PATENTS

| | | |
|---|---|---|
| 869,152 | Alline | Oct. 22, 1907 |
| 1,346,160 | Barlow | July 13, 1920 |
| 2,324,361 | Chandler | July 13, 1943 |
| 2,517,085 | Cirillo | Aug. 1, 1950 |
| 2,558,388 | Richardson | June 26, 1951 |
| 2,586,843 | McDonald | Feb. 26, 1952 |
| 2,609,954 | Sutherland et al. | Sept. 9, 1952 |
| 2,613,823 | Johns | Oct. 14, 1952 |
| 2,655,401 | Kelso | Oct. 13, 1953 |

FOREIGN PATENTS

| | | |
|---|---|---|
| 410,287 | Germany | Mar. 2, 1925 |
| 782,403 | France | Mar. 18, 1935 |